United States Patent
Nuli et al.

(10) Patent No.: US 9,136,528 B2
(45) Date of Patent: Sep. 15, 2015

(54) MAGNESIUM SECONDARY BATTERY, USE OF ELECTROLYTIC SOLUTION IN MAGNESIUM SECONDARY BATTERY AND ELECTROLYTIC SOLUTION FOR MAGNETIC SECONDARY BATTERY

(75) Inventors: Yanna Nuli, Shanghai (CN); Qingsong Zhao, Shanghai (CN); Jun Yang, Shanghai (CN); Yongsheng Guo, Shanghai (CN)

(73) Assignees: TOYOTA JIDOSHA KABUSHIKI KAISHA, Toyota (JP); SHANGHAI JIAO TONG UNIVERSITY, Shanghai (CN)

( * ) Notice: Subject to any disclaimer, the term of this patent is extended or adjusted under 35 U.S.C. 154(b) by 522 days.

(21) Appl. No.: 13/403,381

(22) Filed: Feb. 23, 2012

(65) Prior Publication Data

US 2012/0219867 A1    Aug. 30, 2012

(30) Foreign Application Priority Data

Feb. 28, 2011  (CN) .......................... 2011 1 0056952

(51) Int. Cl.
  *H01M 10/0569* (2010.01)
  *H01M 4/13* (2010.01)
  *H01M 4/46* (2006.01)
  *H01M 10/054* (2010.01)
  *H01M 10/0568* (2010.01)

(52) U.S. Cl.
  CPC ............... *H01M 4/13* (2013.01); *H01M 4/466* (2013.01); *H01M 10/054* (2013.01); *H01M 10/0568* (2013.01); *H01M 10/0569* (2013.01); *Y02E 60/122* (2013.01)

(58) Field of Classification Search
  CPC ..................... H01M 10/0564; H01M 10/0568; H01M 10/0569; H01M 10/0566; H01M 10/054; H01M 4/13; H01M 4/466; Y02E 60/122
  USPC .................................................. 429/337, 341
  See application file for complete search history.

(56) References Cited

U.S. PATENT DOCUMENTS

| | | | |
|---|---|---|---|
| 2007/0172737 A1* | 7/2007 | Oki et al. ...................... | 429/304 |
| 2009/0286157 A1* | 11/2009 | Chen et al. .................... | 429/209 |
| 2011/0111286 A1 | 5/2011 | Yamamoto et al. | |
| 2012/0021279 A1 | 1/2012 | Le Bideau et al. | |
| 2012/0107698 A1* | 5/2012 | Muldoon et al. .............. | 429/337 |
| 2013/0337328 A1 | 12/2013 | Yamamoto et al. | |

FOREIGN PATENT DOCUMENTS

| CN | 1365524 A | 8/2002 |
|---|---|---|
| CN | 101197436 A | 6/2008 |

(Continued)

OTHER PUBLICATIONS

Gregory et al., "Nonaqueous Electrochemistry of Magnesium," *J. Electrochem. Soc.*, vol. 137, No. 3, pp. 775-780, 1990.

(Continued)

*Primary Examiner* — Cynthia Kelly
*Assistant Examiner* — Rashid Alam
(74) *Attorney, Agent, or Firm* — Oliff PLC

(57) ABSTRACT

A magnesium secondary battery includes a positive electrode, a negative electrode, a separator membrane and an electrolytic solution. The electrolytic solution includes nitrogen-containing heterocyclic magnesium halide and an organic ether solvent.

8 Claims, 4 Drawing Sheets

(56) References Cited

FOREIGN PATENT DOCUMENTS

| | | |
|---|---|---|
| JP | A-2010-015979 | 1/2010 |
| WO | WO 01/09972 A1 | 2/2001 |
| WO | WO 2010/092258 A1 | 8/2010 |
| WO | WO 2012/057880 A2 | 5/2012 |

OTHER PUBLICATIONS

Aurbach et al., "Prototype systems for rechargeable magnesium batteries," *Letters to Nature*, vol. 407, pp. 724-727, 2000.

Yuan et al., "The study and development of rechargeable magnesium battery," *Battery Bimonthly*, vol. 32, pp. 14-17, 2002 (with English Abstract).

Feng et al., "Development of Rechargeable Magnesium Battery," pp. 73-79, 2007 (with English Abstract).

English Abstract of Genders et al., "Studies using micrelectrodes of the Mg(II)/Mg couple in teraphydrofuran and propylene carbonate," *Journal of Electroanalytical Chemistry*, vol. 199, No. 1, pp. 93-100, 1986.

Lu et al., "On the electrochemical behavior of magnesium electrodes in polar aprotic electrolyte solutions," *Journal of Electroanalytical Chemistry*, vol. 466, pp. 203-217, 1999.

Guo et al., "Study of electronic effect of Grignard reagents on their electrochemical behavior," *Electrochemistry Communications*, vol. 12, pp. 1671-1673, 2010.

Aurbach et al., "Magnesium Deposition and Dissolution Processes in Ethereal Grignard Salt Solutions Using Simultaneous EQCM-EIS and In Situ FTIR Spectroscopy," *Electrochemical and Solid-State Letters*, vol. 3, No. 1, pp. 31-34, 2000.

C. Liebenow, Z. Yang, P. Lobitz, The electrodeposition of magnesium using solutons of organomagnesium halides, amidomagnesium halides and magnesium organoborates, Electrochemistry Communications, Sep. 2000, vol. 2, pp. 641-645.

\* cited by examiner

MAGNESIUM SECONDARY BATTERY, USE OF ELECTROLYTIC SOLUTION IN MAGNESIUM SECONDARY BATTERY AND ELECTROLYTIC SOLUTION FOR MAGNETIC SECONDARY BATTERY

The present invention relates to a magnesium secondary battery, use of an electrolytic solution in a magnesium secondary battery and an electrolytic solution for a magnesium secondary battery.

BACKGROUND OF THE INVENTION

Magnesium is one of the metal elements having the largest reserves on earth. Magnesium has excellent mechanical, physical and chemical properties and is used in various fields. In the periodic table of the elements, magnesium and lithium are located at positions diagonal from each other and these elements have the similar ionic radii and similar chemical properties. The electric potential for magnesium is higher than that of lithium (the potential for lithium is −3.03 V while the potentials for magnesium are −2.37 V (acidic) and −2.69 V (alkaline). Theoretical specific capacity of magnesium is lower than that of lithium (the theoretical specific capacity of lithium is 3862 mAh/g while that of magnesium is 2205 mAh/g). However, since magnesium is low cost, easy to handle and highly safe, a magnesium secondary battery including magnesium as a negative electrode has attracted attention as a subject of research for new types of battery systems. See Gregory T D, Hoffman R J, Winterton, Development of an ambient secondary magnesium battery, J. Electrochem. Soc., 137(1990)775-780; Aurbach D, Lu Z, Schechter A, Gofer Y, Gizbar H, Turgemann R, Cohen Y, Moshkovich M, Levi E, Prototype systems for rechargeable magnesium batteries Nature, 407(2000)724-727; YUAN Hua-tang; WU Feng; WU Xu-li; Li Qiang, The study and development of rechargeable magnesium battery, battery, 2002, 32(6): 14-17; FENG Zhen-Zhen; NULI Yan-Na; WANG Jiu-Lin; YANG Jun Development of rechargeable magnesium battery, Chemical and Physical Power Sources, 2007, 1:79-79.

An electrolytic solution for a magnesium secondary battery is closely related with reversible electrochemical deposition of magnesium. Thus, studies regarding properties of magnesium in various electrolytic solutions have been widely conducted. As an electrolytic solution having high reversibility of magnesium deposition and dissolution, a system including a Grignard reagent of an organic ether is known. However, this system of Grignard reagent has low electric conductivity (less than 0.5 ms/cm) and low anodic stability (i.e., potential of anode oxidization decomposition is less than 2.3 V vs. Mg). For example, electric conductivity of a system of ethyl magnesium bromide(chloride)/THF is as low as 0.26 ms/cm, and the potential of anode oxidization decomposition is 1.5 V vs. Mg (Genders J D, Pletcher D, Studies using microelectrodes of the Mg (II)/Mg couple in teraphydrofuran and propylene carbonate, J. Electroanal. Chem. 199(1986) 93-100; Lu Z, Schechter A, Moshkovich M, Aurbach D, On the electrochemical behavior of magnesium electrodes in polar aprotic electrolyte solutions, J. Electroanal. Chem., 466(1999) 203-217; Guo Y S, Yang J, NuLi Y N, Wang J L, Study of electronic effect of Grignard reagents on their electrochemical behavior, Electrochem. Commun., 12(2010), 1671-1673). Anodic stability of the system of a Grignard reagent-electrolytic solution is determined based on a C—Mg bond in the Grignard reagent. Since the stability of the C—Mg bond is low, when the Grignard reagent-electrolytic solution is used for an electrolytic solution for a rechargeable battery, improvement of its anodic stability, in particular, improvement of its compatibility with a material for a positive electrode is expected (Aurbach D, Moshkovich M, Schechter A, Turgeaman R, Magnesium Deposition and Dissolution Processes in Ethereal Grignard Salt Solutions Using Simultaneous EQCM-EIS and In Situ FTIR Spectroscopy, Electrochem. Solid-State Lett., 3(2000)31-34).

At present, the most advanced system for an electrolytic solution for a magnesium secondary battery is a system of 0.25 mol/L $Mg(AlCl_2EtBu_2)$/tetrahydrofuran (wherein Et is ethyl and Bu is buthyl) proposed by Israeli scientist Mr. Aurbach. The potential for anode oxidization decomposition is 2.5 V vs. Mg (Aurbach D, Luz, Schechter A, Gofer Y, Gizbar H, Turgernann R, Cohen Y, Moshkovich M, Levi E, Nature, 407(2000)724-727).

A major direction of development for current magnesium secondary batteries is to facilitate the development of magnesium secondary batteries having high performance at low cost to seek a low-cost system for an electrolytic solution having at least one of high potential of anode oxidization decomposition, high electric conductivity, high reversibility of magnesium deposition and dissolution, and excellent cycle performance.

SUMMARY OF THE INVENTION

An object of the invention is to provide a magnesium secondary battery having high performance at low cost.

According to a first aspect of the invention, a magnesium secondary battery comprising a positive electrode, a negative electrode, a separator membrane and an electrolytic solution, wherein the electrolytic solution includes nitrogen-containing heterocyclic magnesium halide and an organic ether solvent, is provided.

According to a second aspect of the invention, use of an electrolytic solution including nitrogen-containing heterocyclic magnesium halide and an organic ether solvent in a magnesium secondary battery is provided.

According to a third aspect of the invention, an electrolytic solution for a magnesium secondary battery comprising nitrogen-containing heterocyclic magnesium halide and an organic ether solvent is provided.

DETAILED DESCRIPTION OF THE PREFERRED EMBODIMENTS

Figure 1:
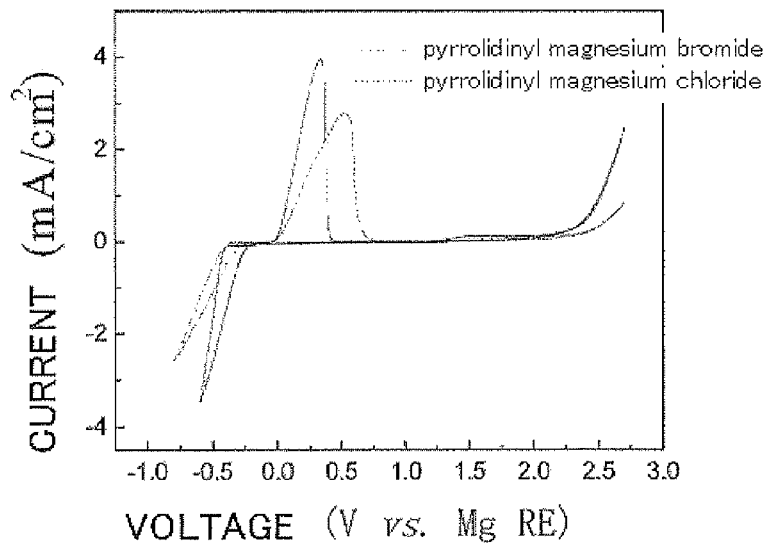
FIG. 1 is a graph comparing cyclic voltammogram curves at the Pt working electrodes when an electrolytic solution of 1 mol/L pyrrolidinyl magnesium bromide/tetrahydrofuran and an electrolytic solution of 1 mol/L pyrrolidinyl magnesium chloride/tetrahydrofuran obtained in Examples 1 and 3 are used as electrolytic solutions for reversible deposition and dissolution of magnesium.

The present invention will be described in accordance with some embodiments hereinafter.

According to a first aspect of the invention, a magnesium secondary battery comprising a positive electrode, a negative electrode, separator membrane, and electrolytic solution, wherein the electrolytic solution includes nitrogen-containing heterocyclic magnesium halide and an organic ether solvent, is provided.

In one embodiment, the electrolytic solution has a concentration of 0.2 to 2 mol/L. As used herein, the concentration of the electrolytic solution refers to a concentration of solute in the electrolytic solution.

In another embodiment, the nitrogen-containing heterocyclic magnesium halide includes an N—Mg bond and the nitrogen-containing heterocyclic magnesium halide is at least one selected from the group consisting of pyrrolidinyl magnesium bromide, pyrrolidinyl magnesium chloride, pyrrolyl magnesium bromide, pyrrolyl magnesium chloride, pyrazolyl magnesium bromide, pyrazolyl magnesium chloride, piperidyl magnesium bromide, piperidyl magnesium chloride, imidazolyl magnesium bromide, imidazolyl magnesium chloride, carbazolyl magnesium bromide, carbazolyl magnesium chloride, indolyl magnesium bromide, indolyl magnesium chloride, purine magnesium bromide, purine magnesium chloride, piperidyl magnesium bromide, piperidyl magnesium chloride, imidazolinyl magnesium bromide, imidazolinyl magnesium chloride, benzimidazolyl magnesium bromide, benzimidazolyl magnesium chloride, phenothiazinyl magnesium bromide, phenothiazinyl magnesium chloride, tetrahydroquinolinyl magnesium bromide, tetrahydroquinolinyl magnesium chloride, imidazopyridine magnesium bromide, imidazopyridine magnesium chloride, thienylpyridine magnesium bromide, thienylpyridine magnesium chloride, 1,4,7-triazacyclononane magnesium bromide and 1,4,7-triazacyclononane magnesium chloride.

In another embodiment, the organic ether is at least one selected from the group consisting of tetrahydrofuran, 2-methyl tetrahydrofuran, ethyl ether, dimethyl ether, ethylene glycol dimethyl ether, diethylene glycol dimethyl ether and tetraethylene glycol dimethyl ether.

According to a second aspect of the invention, use of an electrolytic solution including nitrogen-containing heterocyclic magnesium halide and an organic ether solvent in a magnesium secondary battery is provided.

In one embodiment, the electrolytic solution has a concentration of 0.2 to 2 mol/L.

In another embodiment, the magnesium secondary battery is fabricated by producing a positive electrode, wherein the producing comprises:

adding 0.6 to 1.8 parts by weight of a conductive agent and 0.4 to 1.5 parts by weight of an adhesive agent to 6.7 to 9.0 parts by weight of a material for the positive electrode;

stirring the mixture uniformly;

applying the mixture to a current collector at the thickness from 50 μm to 100 μm;

drying the mixture in an oven at the temperature from 60° C. to 90° C.;

pressing the mixture with a punch having a diameter from 10 mm to 16 mm into a piece;

pressing the piece at the pressure from 0.5 MPa to 2 MPa; and vacuum drying the piece at the temperature from 70° C. to 130° C. for 5 hours to 12 hours to produce the positive electrode;

transporting the positive electrode to a glove box filled with an Argon atmosphere;

providing a negative electrode, wherein the negative electrode is metal magnesium;

providing a separator membrane, wherein the separator membrane is a polyethylene membrane; and adding 5 to 30 parts by weight of 0.2 to 2 mol/L of an electrolytic solution.

An adhesive agent used for the invention may be polyvinylidene fluoride, polytetrafluoroethylene or styrene butadiene rubber.

A current collector used for the invention may be a copper foil, an aluminum foil or foam nickel.

A method for measuring a magnesium secondary battery of the invention is as follows.

Measurement of Electric Conductivity 0.2 to 2 mol/L of an electrolytic solution is added into a cell (inLab 710, Mettler Toledo, Switzerland) for measuring electric conductivity and set into a glove box filled with an Argon atmosphere and the electric conductivity is measured with an FE30 conductivity meter.

Cycle Voltage-Current Test

In a three-electrode tube, a metal piece is set as a working electrode, 2 to 5 ml of 0.2 to 2 mol/L of the electrolytic solution is added to the tube, metal magnesium is set as a counter electrode and a reference electrode to form a three-electrode system. Then, in the glove box filled with an Argon atmosphere, a cycle voltage-current test is conducted at the scanning speed of 1 to 300 mV/S.

Measurement of Deposition-Dissolution Performance of Magnesium

A metal piece is set as a positive electrode. 0.1 to 0.5 ml of 0.2 to 2 mol/L of the electrolytic solution is added. Metal magnesium is set as a negative electrode and polyethylene is set as a separator membrane to form a button-type battery. Then, the deposition-dissolution performance of magnesium is measured for the battery under the conditions of a charge-discharge current of 0.1 to 10 mA/cm$^2$, a discharge period of 5 to 120 minutes and a charge-off voltage of 0.8 V vs. Mg.

X-Ray Diffraction (XRD) and Scanning Electron Micrograph

A metal piece is set as a positive electrode. 0.1 to 0.5 ml of 0.2 to 2 mol/L of the electrolytic solution is added. Metal magnesium is set as a negative electrode and polyethylene is set as a separator membrane to form a button-type battery. Then, electrochemical deposition is conducted under the conditions of a deposition current density of 1 to 10 mA/cm$^2$ and a discharge period of 5 to 24 hours. Then, the battery is decomposed in the glove box filled with an Argon atmosphere and flushed with tetrahydrofuran to measure the deposits by X-ray diffraction (XRD) and scanning electron micrography.

A metal piece used for the invention may be platinum, copper, aluminum, nickel or silver.

According to a third aspect of the invention, an electrolytic solution for a magnesium secondary battery comprising nitrogen-containing heterocyclic magnesium halide and an organic ether solvent (a solution of nitrogen-containing heterocyclic magnesium halide/organic ether) is provided.

The electrolytic solution may have a concentration of 0.2 to 2 mol/L.

The solution of nitrogen-containing heterocyclic magnesium halide/organic ether is used. The nitrogen-containing heterocyclic magnesium halide has great ion binding performance due to binding force of N—Mg. Thus, anodic stability of the electrolytic solution is improved and the potential of anode oxidization becomes 2.7 V vs. Mg or higher. Due to the anodic stability of the system, the initial efficiency in a deposition-dissolution cycle is greatly improved to 92% or higher. After fifteen (15) cycles have completed, the rate of deposition-dissolution of magnesium is maintained to 98% or higher. In addition, the number of cycles may reach 350 or more.

The present invention will be further described with reference to the following examples but the invention is not limited thereto. All the reagents used in the examples are commercially available or may be prepared by well known techniques in the art.

EXAMPLES

Example 1

To 75 mg of cobalt magnesium silicate, 15 mg of acetylene black as a conductive agent and 10 mg of polyvinylidene fluoride as an adhesive agent were added and stirred uniformly. Then, the mixture was coated to a copper foil at the thickness of 100 μm. Then, the copper foil was dried in an oven at 80° C. and pressed into a piece with a punch having a diameter of 12 mm. The piece was pressed at the pressure of 1 MPa and vacuum dried at 80° C. for 10 hours to form a positive electrode. Then, the positive electrode was transferred to a glove box filled with an Argon atmosphere. Metal magnesium was used as a negative electrode. A polyethylene membrane was used as a separator membrane. 0.3 mL of an electrolytic solution of 1 mol/L pyrrolidinyl magnesium bromide/tetrahydrofuran was added to fabricate a magnesium secondary battery. Measurements of constant current charge and discharge performance with a LAND Battery Test System (Wuhan LAND Electronic Co., Ltd) showed that charge-discharge off-state voltage for $Mg/Mg^{2+}$ was 0.5 V to 2.1 V and the discharge capacity of the magnesium secondary battery at 0.1 C rate exceeded 50 mAh/g.

In the glove box filled with an Argon atmosphere, 4 mL of an electrolytic solution of 1 mol/L pyrrolidinyl magnesium bromide/tetrahydrofuran was added into an inLab 710 conductivity cell (Mettler Toledo, Switzerland) to measure the conductivity with an FE30 conductivity meter. The conductivity of the electrolytic solution was 0.647 mS/cm.

Platinum was used as a working electrode, 3 ml of an electrolytic solution of 1 mol/L pyrrolidinyl magnesium bromide/tetrahydrofuran was added, metal magnesium was used as a counter electrode and a reference electrode to form a three-electrode system. In the glove box filled with an Argon atmosphere, a cyclic voltammogram test was conducted at the scanning speed of 50 mV/S. The result of the cyclic voltammogram test was shown in FIG. 1. As shown, a reduction-oxidation process appearing near 0 V vs. Mg corresponds to the deposition and dissolution of magnesium. The potential of anode oxidization was 2.3 V vs. Mg.

Figure 3:
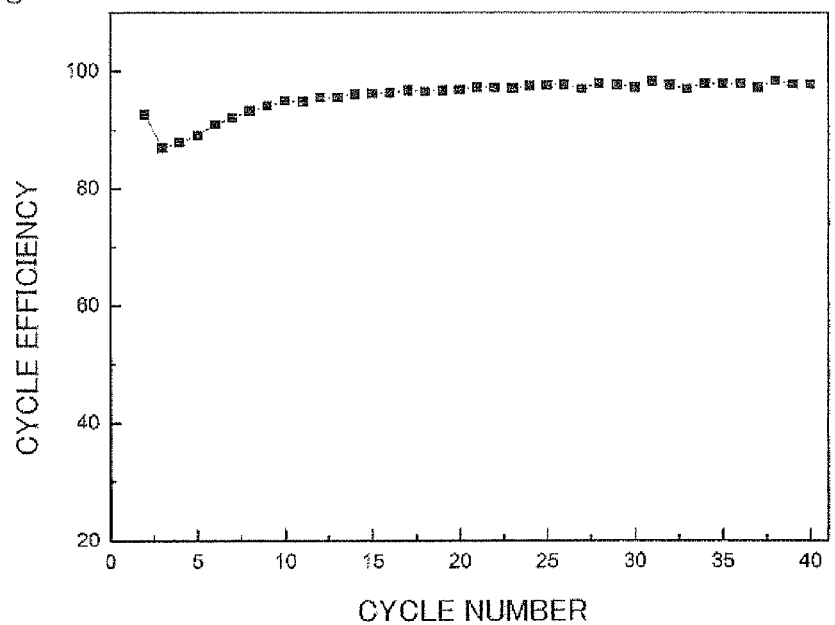
FIG. 3 is a graph of the curve representing an efficiency of magnesium deposition and dissolution at the initial phrase of the cycles in an electrolytic solution of 1 mol/L of pyrrolidinyl magnesium bromide/tetrahydrofuran obtained in Example 1.
Figure 4:
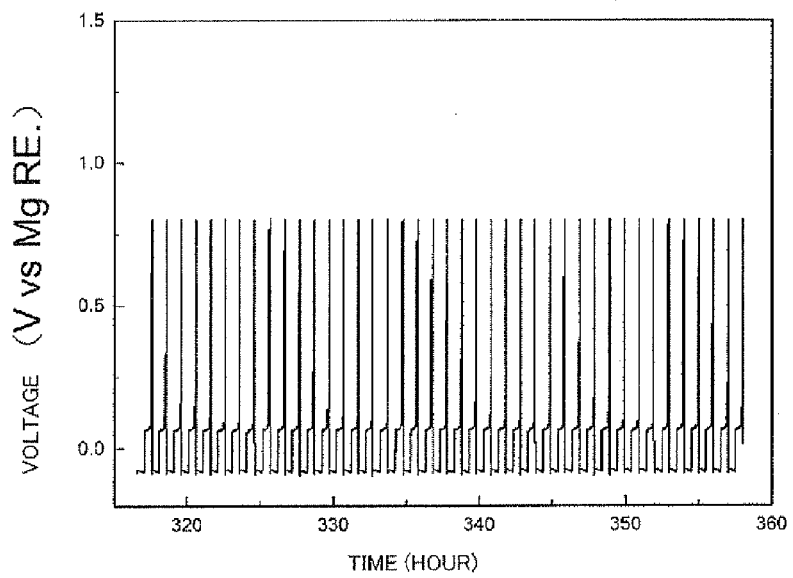
FIG. 4 is a graph of the curve representing cycle performance of magnesium deposition and dissolution at the initial phrase of the cycles in an electrolytic solution of 1 mol/L of pyrrolidinyl magnesium bromide/tetrahydrofuran obtained in Example 1.

Cu was used as a positive electrode and 0.3 mL of an electrolytic solution of 1 mol/L pyrrolidinyl magnesium bromide/tetrahydrofuran was added, metal magnesium was used as a negative electrode, and polyethylene was used as a separator membrane to fabricate a button-type battery. Then, performance of deposition and dissolution of magnesium was measured on the conditions of charge-discharge current of 1 $mA/cm^2$, discharge period of 30 minutes, the charge-discharge off-state voltage of 0.8 V vs. Mg. The results for the deposition and dissolution efficiency of magnesium at the initial phase of the cycles were shown in FIG. 3. As shown, cycle efficiency at the initial time was 92.6%. After 15 cycles, the cycle efficiency approached 98%. The number of the cycles was 350 or more. FIG. 4 was a graph of the curve representing deposition and dissolution of magnesium during the stable phase of the cycles. The deposition potential was −0.07 V vs. Mg and the dissolution potential was 0.065 V vs. Mg.

Figure 5:
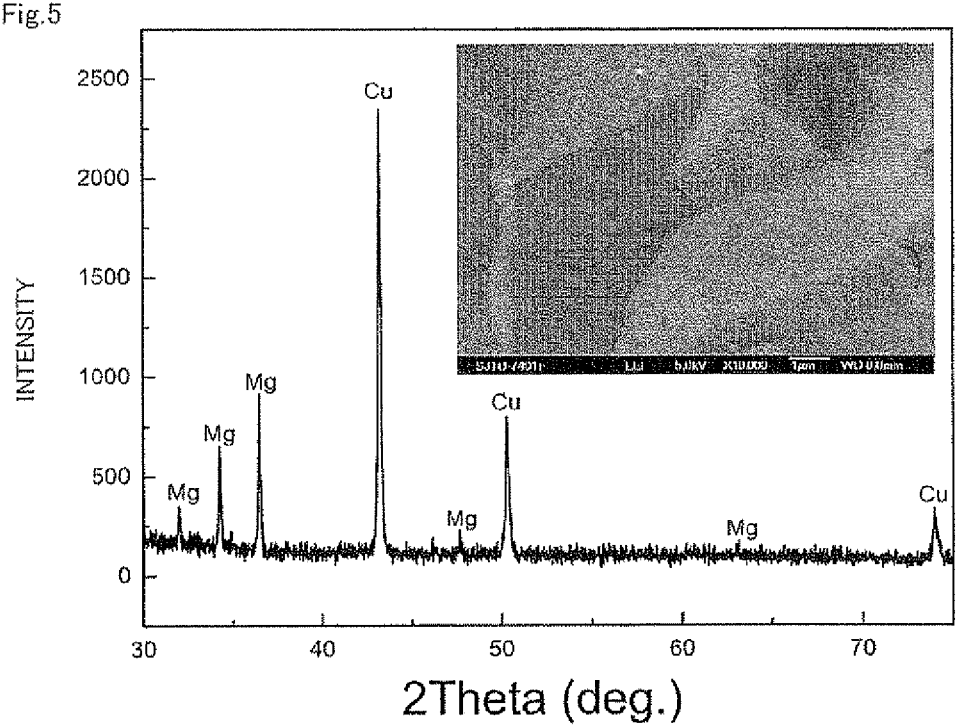
FIG. 5 illustrates an X-ray diffraction and a scanning electron micrograph (legend) of the deposition at Cu substrate in the electrolytic solution of 1 mol/L pyrrolidinyl magnesium bromide/tetrahydrofuran obtained in Example 1.

A metal piece was used as a positive electrode and 0.3 mL of an electrolytic solution of 1 mol/L pyrrolidinyl magnesium bromide/tetrahydrofuran was added, metal magnesium was used as a negative electrode, and polyethylene was used as a separator membrane to fabricate a button-type battery. Then, electrochemical deposition was conducted on the condition of charge-discharge current of 0.2 $mA/cm^2$ and deposition period of 10 hours. Then, the battery was decomposed in a glove box filled with an Argon atmosphere and washed with tetrahydrofuran. Deposits were measured by X-ray diffraction (XRD) and scanning electron microscope (SEM). As illustrated in FIG. 5, the result of XRD showed that diffraction peaks appearing at 32.0, 34.3, 36.4 and 47.7 except for the diffraction peaks for substrate Cu (43.2, 50.3 and 73.9 respectively) were peaks for metal magnesium (JCPDS 35-0821). The result of SEM showed (see the legend in FIG. 5) that layers of the deposited magnesium were compact and flat.

Example 2

To 75 mg of cobalt magnesium silicate, 15 mg of acetylene black as a conductive agent and 10 mg of polyvinylidene fluoride as an adhesive agent were added and stirred uniformly. Then, the mixture was coated to a copper foil at the thickness of 100 μm. Then, the copper foil was dried in an oven at 80° C. and pressed into a piece with a punch having a diameter of 12 mm. The piece was pressed at the pressure of 1 MPa and vacuum dried at 80° C. for 10 hours to form a positive electrode. Then, the positive electrode was transferred to a glove box filled with an Argon atmosphere. Metal magnesium was used as a negative electrode. A polyethylene membrane was used as a separator membrane. 0.3 mL of an electrolytic solution of 1 mol/L pyrazolyl magnesium bromide/tetrahydrofuran was added to fabricate a magnesium secondary battery. Measurements of constant current charge and discharge performance with a LAND Battery Test System (Wuhan LAND Electronic Co., Ltd) showed that charge-discharge off-state voltage for $Mg/Mg^{2+}$ was 0.5 V to 2.5 V and the discharge capacity of the magnesium secondary battery at 0.1 C rate exceeded 120 mAh/g.

Figure 2:
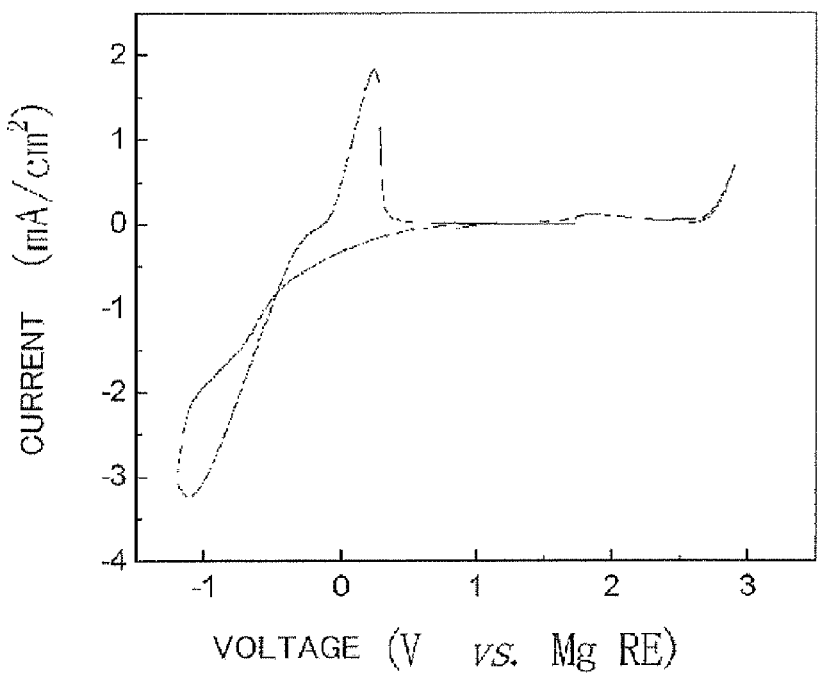
FIG. 2 is a graph representing cyclic voltammogram curves in an electrolytic solution of 1 mol/L pyrazolyl magnesium bromide/tetrahydrofuran obtained in Example 2 at the Pt working electrodes.

Platinum was used as a working electrode, 3 ml of an electrolytic solution of 1 mol/L pyrazolyl magnesium bromide/tetrahydrofuran was added, metal magnesium was used as a counter electrode and a reference electrode to form a three-electrode system. In the glove box filled with an Argon atmosphere, a cyclic voltammogram test was conducted at the scanning speed of 50 mV/S. The result of the cyclic voltammogram test was shown in FIG. 2. As shown, a reduction-oxidation process appearing near 0V vs. Mg corresponded to deposition and dissolution of magnesium. Introduction of two nitrogens enlarged an electrochemical window of the electrolytic system. The potential of anode oxidization was 2.7 V vs. Mg. This value was higher than the potential of anode oxidization of 0.25 mol/L MeAlCl$_2$EtBu$_2$)/tetrahydrofuran system (about 2.5 V vs. Mg) that was a rechargeable magnesium electrolytic solution having the best performance at present.

Cu was used as a positive electrode and 0.3 mL of an electrolytic solution of 1 mol/L pyrazolyl magnesium bromide/tetrahydrofuran was added, metal magnesium was used as a negative electrode, and polyethylene was used as a separator membrane to fabricate a button-type battery. Then, performance of deposition and dissolution of magnesium was measured on the conditions of charge-discharge current of 1 mA/cm$^2$, discharge period of 30 minutes, the charge-discharge off-state voltage of 0.8 V vs. Mg. The cycle efficiency at the initial time was 60% or more. After 15 cycles, the cycle efficiency was 90% or more. After 100 cycles, the cycle efficiency was 98% or more.

Cu was used as a positive electrode and 0.3 mL of an electrolytic solution of 1 mol/L pyrazolyl magnesium bromide/tetrahydrofuran was added, metal magnesium was used as a negative electrode, and polyethylene was used as a separator membrane to fabricate a button-type buttery. Then, electrochemical deposition was conducted on the condition of charge-discharge current of 0.2 mA/cm$^2$ and deposition period of 10 hours. Then, the battery was decomposed in the glove box filled with an Argon atmosphere and washed with tetrahydrofuran. The deposit was measured by X-ray diffraction (XRD), resulting in detection of Mg crystal that was electrochemically deposited.

Example 3

To 75 mg of cobalt magnesium silicate, 15 mg of acetylene black as a conductive agent and 10 mg of polyvinylidene fluoride as an adhesive agent were added and stirred uniformly. Then, the mixture was coated to a copper foil at the thickness of 100 μm. Then, the copper foil was dried in an oven at 80° C. and pressed into a piece with a punch having a diameter of 12 mm. The piece was pressed at the pressure of 1 MPa and vacuum dried at 80° C. for 10 hours to form a positive electrode. Then, the positive electrode was transferred to a glove box filled with an Argon atmosphere. Metal magnesium was used as a negative electrode. A polyethylene membrane was used as a separator membrane. 0.3 mL of an electrolytic solution of 1 mol/L pyrrolidinyl magnesium chloride/tetrahydrofuran was added to fabricate a magnesium secondary battery. Measurements of constant current charge and discharge performance with a LAND Battery Test System (Wuhan LAND Electronic Co., Ltd) showed that charge-discharge off-state voltage for Mg/Mg$^{2+}$ was 0.5 V to 2.1 V and the discharge capacity of the magnesium secondary battery at 0.1 C rate exceeded 50 mAh/g.

In the glove box filled with an Argon atmosphere, 4 mL of an electrolytic solution of 1 mol/L pyrrolidinyl magnesium chloride/tetrahydrofuran was added into an inLab 710 conductivity cell (Mettler Toledo, Switzerland) to measure the conductivity with an FE30 conductivity meter. The conductivity of the electrolytic solution was 0.702 mS/cm.

Platinum was used as a working electrode, 3 ml of an electrolytic solution of 1 mol/L pyrrolidinyl magnesium chloride/tetrahydrofuran was added, metal magnesium was used as a counter electrode and a reference electrode to form a three-electrode system. In the glove box filled with an Argon atmosphere, a cyclic voltammogram test was conducted at the scanning speed of 50 mV/S. The result of the cyclic voltammogram test was shown in FIG. 1. As shown, a reduction-oxidation process appearing near 0 V vs. Mg corresponded to deposition and dissolution of magnesium. The potential of anode oxidization was 2.3 V vs. Mg.

Comparative Example 1

To 75 mg of cobalt magnesium silicate, 15 mg of acetylene black as a conductive agent and 10 mg of polyvinylidene fluoride as an adhesive agent were added and stirred uniformly. Then, the mixture was coated to a copper foil at the thickness of 100 μm. Then, the copper foil was dried in an oven at 80° C. and pressed into a piece with a punch having a diameter of 12 mm. The piece was pressed at the pressure of 1 MPa and vacuum dried at 80° C. for 10 hours to form a positive electrode. Then, the positive electrode was transferred to a glove box filled with an Argon atmosphere. Metal magnesium was used as a negative electrode. A polyethylene membrane was used as a separator membrane. 0.3 mL of an electrolytic solution of 0.25 mol/L Mg(AlCl$_2$EtBu$_2$)/tetrahydrofuran was added to fabricate a magnesium secondary battery. Measurements of constant current charge and discharge performance with a LAND Battery Test System (Wuhan LAND Electronic Co., Ltd) showed that charge-discharge off-state voltage for Mg/Mg$^{2+}$ was 0.5 V to 2.1 V and the discharge capacity of the magnesium secondary battery at 0.1 C rate exceeded 100 mAh/g.

Figure 6:
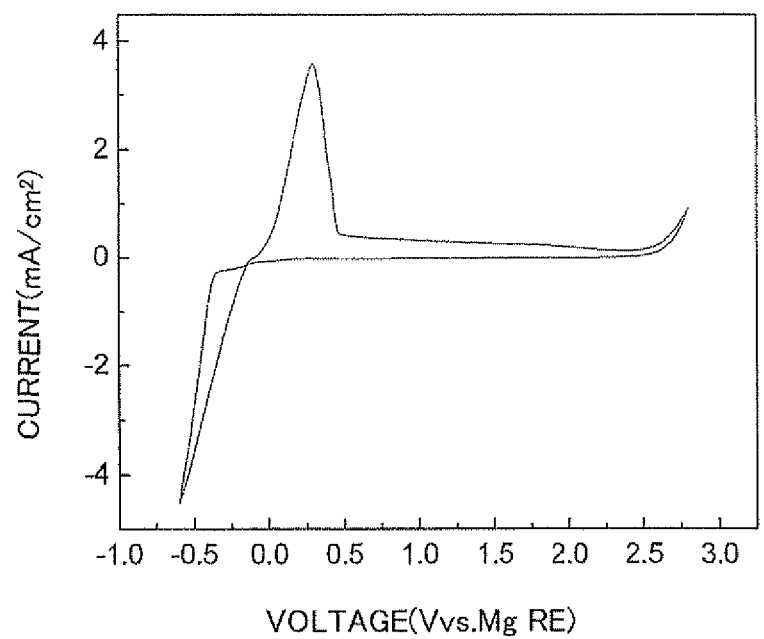
FIG. 6 is a graph representing cyclic voltammogram curves of an electrolytic solution of 0.25 mol/L M g (AlCl$_2$EtBu$_2$)/tetrahydrofuran obtained in Comparative example 1 at the Pt working electrodes.

Platinum was used as a working electrode, 3 ml of an electrolytic solution of 0.25 mol/L Mg(AlCl$_2$EtBu$_2$)/tetrahydrofuran was added, metal magnesium was used as a counter electrode and a reference electrode to form a three-electrode system. In the glove box filled with an Argon atmosphere, a cyclic voltammogram test was conducted at the scanning speed of 50 mV/S. The result of the cyclic voltammogram test was shown in FIG. 6. As shown, a reduction-oxidation process appearing near 0 V vs. Mg corresponded to deposition and dissolution of magnesium. The potential of anode oxidization was 2.5 V vs. Mg.

As evidenced by Examples 1 to 3 and Comparative example 1, the magnesium secondary batteries using an electrolytic solution including nitrogen-containing heterocyclic magnesium halide such as pyrazolyl magnesium bromide exhibited high performances including potential of anode oxidization. The potentials of such batteries are equivalent to that of the magnesium secondary battery using a conventional electrolytic solution including Mg(AlCl$_2$EtBu$_2$)/tetrahydrofuran. Since the nitrogen-containing heterocyclic magnesium halide such as pyrrolidinyl magnesium bromide was easy to produce, such halide can be provided at low cost. Thus, the magnesium secondary battery using an electrolytic solution containing the nitrogen-containing heterocyclic magnesium halide such as pyrrolidinyl magnesium bromide can be also provided at law cost.

The invention claimed is:
1. A magnesium secondary battery comprising a positive electrode, a negative electrode, a separator membrane and an electrolytic solution,
  wherein the electrolytic solution includes nitrogen-containing heterocyclic magnesium halide and an organic ether solvent, and
  the nitrogen-containing heterocyclic magnesium halide is at least one selected from the group consisting of a pyrrolidinyl compound, a pyrrolyl compound, a pyrazolyl compound, an imidazolyl compound, a carbazolyl compound, an indolyl compound, a purine compound, an imidazolinyl compound, a benzimidazolyl compound, a phenothiazinyl compound, a tetrahydroquino- linyl compound, an imidazopyridine compound, a thienylpyridine compound, and a triazacyclononane compound.

2. The magnesium secondary battery according to claim 1, wherein the electrolytic solution has a concentration of 0.2 to 2 mol/L.

3. The magnesium secondary battery according to claim 1, wherein the nitrogen-containing heterocyclic magnesium halide includes an N—Mg bond, and nitrogen-containing heterocyclic magnesium halide is at least one selected from the group consisting of pyrrolidinyl magnesium bromide, pyrrolidinyl magnesium chloride, pyrrolyl magnesium bromide, pyrrolyl magnesium chloride, pyrazolyl magnesium bromide, pyrazolyl magnesium chloride, imidazolyl magnesium bromide, imidazolyl magnesium chloride, carbazolyl magnesium bromide, carbazolyl magnesium chloride, indolyl magnesium bromide, indolyl magnesium chloride, purine magnesium bromide, purine magnesium chloride, imidazolinyl magnesium bromide, imidazolinyl magnesium chloride, benzimidazolyl magnesium bromide, benzimidazolyl magnesium chloride, phenothiazinyl magnesium bromide, phenothiazinyl magnesium chloride, tetrahydroquinolinyl magnesium bromide, tetrahydroquinolinyl magnesium chloride, imidazopyridine magnesium bromide, imidazopyridine magnesium chloride, thienylpyridine magnesium bromide, thienylpyridine magnesium chloride, 1,4,7-triazacyclononane magnesium bromide and 1,4,7-triazacyclononane magnesium chloride.

4. The magnesium secondary battery according to claim 1, wherein the organic ether is at least one selected from the group consisting of tetrahydrofuran, 2-methyl tetrahydrofuran, ethyl ether, dimethyl ether, ethylene glycol dimethyl ether, diethylene glycol dimethyl ether and tetraethylene glycol dimethyl ether.

5. An electrolytic solution for a magnesium secondary battery comprising nitrogen-containing heterocyclic magnesium halide and an organic ether solvent, wherein the nitrogen-containing heterocyclic magnesium halide is at least one selected from the group consisting of a pyrrolidinyl compound, a pyrrolyl compound, a pyrazolyl compound, an imidazolyl compound, a carbazolyl compound, an indolyl compound, a purine compound, an imidazolinyl compound, a benzimidazolyl compound, a phenothiazinyl compound, a tetrahydroquinolinyl compound, an imidazopyridine compound, a thienylpyridine compound, and a triazacyclononane compound.

6. The electrolytic solution according to claim 5, wherein the electrolytic solution has a concentration of 0.2 to 2 mol/L.

7. The electrolytic solution according to claim 5, wherein the nitrogen-containing heterocyclic magnesium halide includes an N—Mg bond, and the nitrogen-containing heterocyclic magnesium halide is at least one selected from the group consisting of pyrrolidinyl magnesium bromide, pyrrolidinyl magnesium chloride, pyrrolyl magnesium bromide, pyrrolyl magnesium chloride, pyrazolyl magnesium bromide, pyrazolyl magnesium chloride, imidazolyl magnesium bromide, imidazolyl magnesium chloride, carbazolyl magnesium bromide, carbazolyl magnesium chloride, indolyl magnesium bromide, indolyl magnesium chloride, purine magnesium bromide, purine magnesium chloride, imidazolinyl magnesium bromide, imidazolinyl magnesium chloride, benzimidazolyl magnesium bromide, benzimidazolyl magnesium chloride, phenothiazinyl magnesium bromide, phenothiazinyl magnesium chloride, tetrahydroquinolinyl magnesium bromide, tetrahydroquinolinyl magnesium chloride, imidazopyridine magnesium bromide, imidazopyridine magnesium chloride, thienylpyridine magnesium bromide, thienylpyridine magnesium chloride, 1,4,7-triazacyclononane magnesium bromide and 1,4,7-triazacyclononane magnesium chloride.

8. The electrolytic solution according to claim 5, wherein the organic ether is at least one selected from the group consisting of tetrahydrofuran, 2-methyl tetrahydrofuran, ethyl ether, dimethyl ether, ethylene glycol dimethyl ether, diethylene glycol dimethyl ether and tetraethylene glycol dimethyl ether.

* * * * *